(12) United States Patent
Al-Mutlaq

(10) Patent No.: US 9,346,713 B2
(45) Date of Patent: May 24, 2016

(54) USE OF A CEMENT ACCELERATOR AND ELECTRIC ARC FURNACE DUST IN CEMENT

(71) Applicant: SAUDI BASIC INDUSTRIES CORPORATION, Riyadh (SA)

(72) Inventor: Fahad M. Al-Mutlaq, Jubail Industrial (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/440,275

(22) PCT Filed: Oct. 29, 2013

(86) PCT No.: PCT/IB2013/003093
§ 371 (c)(1),
(2) Date: May 1, 2015

(87) PCT Pub. No.: WO2014/068409
PCT Pub. Date: May 8, 2014

(65) Prior Publication Data
US 2015/0291476 A1  Oct. 15, 2015

Related U.S. Application Data

(60) Provisional application No. 61/721,065, filed on Nov. 1, 2012.

(51) Int. Cl.
*C04B 28/02* (2006.01)
*C04B 28/04* (2006.01)

(52) U.S. Cl.
CPC ............. *C04B 28/04* (2013.01); *C04B 28/02* (2013.01); *C04B 2201/50* (2013.01); *Y02W 30/94* (2015.05)

(58) Field of Classification Search
CPC .. C04B 28/02; C04B 28/104; C04B 22/0006; C04B 7/24; C04B 7/28; C04B 14/00; C04B 14/36; C04B 18/04; C04B 18/14; C04B 18/149; C04B 18/0481
USPC .......................................... 106/713, 737, 738
See application file for complete search history.

(56) References Cited

U.S. PATENT DOCUMENTS

| | | | | |
|---|---|---|---|---|
| 4,605,435 A * | 8/1986 | Duyvesteyn | .......... | C22B 1/2406 75/773 |
| 4,911,757 A * | 3/1990 | Lynn | ......................... | B09B 3/00 106/697 |
| 5,130,051 A * | 7/1992 | Falk | .......................... | B09C 1/08 106/606 |
| 5,245,122 A * | 9/1993 | Smith | .................... | C04B 18/149 106/791 |
| 5,259,697 A * | 11/1993 | Allen | ....................... | C22B 7/006 106/697 |
| 5,557,031 A | 9/1996 | Al-Sugair et al. | | |
| 5,569,152 A * | 10/1996 | Smith | ....................... | A62D 3/33 106/791 |
| 6,053,857 A * | 4/2000 | Stevens | ..................... | A62D 3/33 106/709 |
| 6,676,725 B2 * | 1/2004 | Aota | ........................ | C22B 1/243 75/246 |
| 7,993,449 B2 * | 8/2011 | de la Roij | ............... | C04B 28/02 106/705 |
| 2003/0023128 A1 | 1/2003 | Smith | | |
| 2010/0037803 A1 | 2/2010 | Al-Negheimish et al. | | |
| 2011/0048285 A1 | 3/2011 | Barbour | | |
| 2012/0049399 A1 | 3/2012 | Al-Zaid et al. | | |

FOREIGN PATENT DOCUMENTS

| CN | 101353240 A | 1/2009 |
|---|---|---|
| DE | 37 16 484 A1 | 11/1988 |
| DE | 3942827 C1 * | 4/1991 |

OTHER PUBLICATIONS

International Search Report issued Jul. 22, 2014 in PCT/IB2013/003093.

Janaína G.M.S. Machado, et al., "Chemical, physical, structural and morphological characterization of the electric arc furnace dust" Journal of Hazardous Materials B, vol. 136, No. 3, XP027884589, 2006, pp. 953-960.

Combined Chinese Office Action and Search Report issued Mar. 2, 2016, in Patent Application No. 201380064693.4 (with English-language translation).

* cited by examiner

*Primary Examiner* — Anthony J Green
(74) *Attorney, Agent, or Firm* — Oblon, McClelland, Maier & Neustadt, L.L.P.

(57) ABSTRACT

The present disclosure relates to cement compositions comprising: (a) cement, (b) an electric arc furnace dust (EAFD), and (c) a cement accelerator; wherein the electric arc furnace dust is present in an amount from greater than 8 wt % based on the total weight of the cement (a); and it relates to cement compositions comprising: (a) cement, (b) an electric arc furnace dust (EAFD), and (c) a cement accelerator comprising calcium chloride, calcium nitrate, or sodium nitrate, or a combination thereof; wherein the electric arc furnace dust is present in an amount from greater than 8 wt % based on the total weight of the cement (a). Also disclosed are methods for making the disclosed compositions and products using the disclosed compositions. This abstract is intended as a scanning tool for purposes of searching in the particular art and is not intended to be limiting of the present invention.

20 Claims, No Drawings

USE OF A CEMENT ACCELERATOR AND ELECTRIC ARC FURNACE DUST IN CEMENT

CROSS REFERENCE TO RELATED APPLICATIONS

The present application is a national stage application of international application PCT/IB2013/003093 having an international filing date of Oct. 29, 2013 and claiming priority to U.S. Provisional Application No. 61/721,065 having a filing date of Nov. 1, 2012.

FIELD OF INVENTION

The present invention relates to cement compositions. The present invention also relates to methods of manufacturing these compositions and products that include these compositions.

BACKGROUND OF THE INVENTION

Electric arc furnace dust (EAFD) is a by-product of the electric steelmaking industry and is produced in large quantities around the world. Recently, the worldwide production rate of EAFD has increased annually as the steel industry grows internationally. The estimated quantity of EAFD produced annually, worldwide, is about 3.7 million tons, of which European sources account for some 500,000-900,000 tons. In the United States, the approximate quantity of the EAFD produced every year is about 700,000-800,000 tons, and this rate of EAFD production is estimated to increase by 4-6% each year. The safe disposal of these by-products is expensive and continues to be a serious concern in many countries throughout the world. For example, the disposal cost in the United States alone has been estimated at upwards of approximately $200 million per year.

Moreover, there continues to be a lack of suitable disposal sites due to the potential negative environmental impact from EAFD. According to most authorities, including the European Waste Catalogue, EAFD is classified as a hazardous material (code 10 02 07), and thus, disposal at landfill sites before treatment is prohibited due to the potential leachability of heavy metals, such as Zn and Pb. Thus, there remains a strong need in the art for methods of safely disposing of EAFD.

SUMMARY OF THE INVENTION

As described in more detail herein, the present invention, in one aspect, relates to a cement composition comprising: (a) cement, (b) an electric arc furnace dust (EAFD), and (c) a cement accelerator; wherein the electric arc furnace dust is present in an amount from greater than 8 wt % based on the total weight of the cement (a).

In another aspect, the invention relates to a method for manufacturing cement that contains electric arc furnace dust, the method comprising: mixing cement ingredients comprising: (i) cement; (ii) an electric arc furnace dust (EAFD); and (iii) a cement accelerator; to thereby form a cement mixture; wherein the electric arc furnace dust is present in an amount from greater than 8 wt % based on the total weight of the cement (i).

In another aspect, the present invention relates to a cement composition comprising: (a) cement, (b) an electric arc furnace dust (EAFD), and (c) a cement accelerator comprising calcium chloride, calcium nitrate, sodium nitrate, or a combination thereof; wherein the electric arc furnace dust is present in an amount from greater than 8 wt % based on the total weight of the cement (a).

In another aspect, the invention relates to a method for manufacturing cement that contains electric arc furnace dust, the method comprising: mixing cement ingredients comprising: (i) cement; (ii) an electric arc furnace dust (EAFD); and (iii) a cement accelerator comprising calcium chloride, calcium nitrate, sodium nitrate, or a combination thereof; to thereby form a cement mixture; wherein the electric arc furnace dust is present in an amount from greater than 0% wt to 8 wt % based on the total weight of the cement (i).

In another aspect, disclosed is a product comprising the disclosed compositions, for example, a cementitious product. In another aspect, disclosed is product made by the disclosed methods.

In one aspect, the disclosed cement compositions comprising EAFD are capable of exhibiting improved early compressive strength and/or workability. Thus, in a further aspect, the disclosed cement compositions have application to uses and products that utilize cement, for example, products and uses requiring early compressive strength. In a still further aspect, the disclosed methods and compositions comprising EAFD also provide for a means of safely disposing of EAFD.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description, examples, drawings, and claims, and their previous and following description. However, before the present compounds, compositions, articles, devices, systems, and/or methods are disclosed and described, it is to be understood that this invention is not limited to the specific compounds, compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known embodiment. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

DEFINITIONS

As used in the specification and in the claims, the term "comprising" may include the embodiments "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a cement accelerator" includes mixtures of two or more cement accelerators.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

It is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

As used herein, the terms "optional" or "optionally" means that the subsequently described event or circumstance can or cannot occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one embodiment to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, the term or phrase "cement" refers to a composition or substance with one or more constituents that is capable of forming cement or binding materials together, once set. Generally, cement can include a number of dry constituents chosen based on the desired ratio or class of cement to be produced. Thus, cement refers to the dry, pre-set composition unless the context clearly dictates otherwise.

As used herein, the term or phrase "electric arc furnace dust" or "EAFD" is a term of art and refers to a solid by-product or material produced from a furnace steelmaking process, and is intended to encompass by-products and materials generated from all steelmaking operation phases and sources, such as, for example, scrap iron furnaces or sponge iron furnaces.

As used herein, the term or phrase "bag house dust" or "BHD" is a term of art and refers to a type of electric arc furnace dust generated in Saudi Arabia, which may, in various aspects, have similar or differing chemical compositions than electric arc furnace dusts produced from different countries.

As used herein, the term or phrase "cement accelerator," "concrete accelerator," "cement accelerating admixture," or "concrete accelerating admixture" refers to a chemical capable of accelerating the hardening (early strength development) of cement or concrete. For example, a "non-chloride cement accelerator" would refer to a chloride-free chemical capable of accelerating the early strength development of cement or concrete.

Composition

As described above, the present invention relates to cement compositions comprising: (a) cement, (b) an electric arc furnace dust (EAFD), and (c) a cement accelerator; wherein the electric arc furnace dust is present in an amount from greater than 8 wt % based on the total weight of the cement (a).

In another aspect, the invention relates to a cement composition comprising: (a) cement, (b) an electric arc furnace dust (EAFD), and (c) a cement accelerator comprising calcium chloride, calcium nitrate, or sodium nitrate, or a combination thereof; wherein the electric arc furnace dust is present in an amount from greater than 0% wt to 8 wt % based on the total weight of the cement (a).

In various aspects, the disclosed compositions comprise cement. Typically, any cement can be used. In a further aspect, the cement comprises hydraulic or non-hydraulic cement, or a combination thereof. In a still further aspect, the cement comprises Portland cement, for example, Ordinary Portland Cement (OPC) Type I, Type II, Type III, Type IV, or Type V, or a combination thereof. In a yet further aspect, the cement comprises a cement blend of two or more types of cement, for example, a blend comprising Portland cement and non-Portland hydraulic cement. In an even further aspect, the cement comprises masonry cement, for example, a mortar or the like. In a still further aspect, the cement is in the dry form. If needed to set, water is typically added after the cement is mixed with the other components, for example, the EAFD and cement accelerator, and it is then ready to be hardened or set. In a further aspect, the water and one or more components are mixed with the cement simultaneously.

In various aspects, the disclosed compositions further optionally comprise one or more additional components. In one aspect, the cement compositions further comprise an aggregate component. In a further aspect, the aggregate component comprises sand, gravel, limestone, granite, marble, or stone, or a combination thereof. In a still further aspect, the aggregate component comprises fine aggregate or course aggregate, or a combination thereof. In this aspect, the aggregate can have various particle sizes and distributions. In a yet further aspect, the aggregate has a size of less than about 50 mm, for example, less than about 40, 35, 30, 25, 20, 15, 10, 5, 4, 3, 2, or 1 mm. In an even further aspect, the aggregate cement is siliceous, for example, quartzite sand or siliceous rounded river gravel. Thus, in one aspect, the aggregate in combination with the cement produces concrete. Typically, the concrete can comprise any concrete.

In various aspects, the disclosed compositions comprise by-products produced from a steelmaking process. In one aspect, the disclosed compositions comprise by-products produced from an electric steelmaking process. In a further aspect, the by-products comprise electric arc furnace dust (EAFD). In a still further aspect, the electric arc furnace dust (EAFD) comprises EAFD produced in various regions, for example, EAFD from North America or Europe or the Middle East. In a yet further aspect, the EAFD comprises EAFD of varying compositions depending on the type of scrap used, type of additives used during the production stage and the type of steel manufacture. For example, in one aspect, the EAFD comprises EAFD generated in Saudi Arabia, also referred to as bag house dust (BHD). In a further aspect, the EAFD comprises unstabilized, untreated EAFD. In a still further aspect, the EAFD comprises stabilized, untreated EAFD. In a yet further aspect, the EAFD comprises treated EAFD. In an even further aspect, the disclosed compositions comprise at least one additional by-product, for example, fly ash, blast furnace slag, or silica fume, or the like. The chemical composition of an exemplary, non-limiting BHD analyzed by X-ray fluorescence spectrometry (XRF) according to the present invention is provided below in Table 1.

TABLE 1

| Element | Average weight (%) |
| --- | --- |
| Aluminum (Al) | 0.17 |
| Calcium (Ca) | 5.79 |
| Iron (Fe) | 29.44 |
| Magnesium (Mg) | 2.5 |
| Manganese (Mn) | 1.52 |
| Lead (Pb) | 1.8 |
| Silicon (Si) | 1.31 |
| Zinc (Zn) | 18.78 |
| Potassium (K) | 3.24 |
| Sodium (Na) | 0.88 |
| Chloride (Cl) | 2.25 |
| Sulfur (S) | 0.46 |
| Phosphorus (P) | 0.13 |
| Copper (Cu) | 0.13 |

In a one aspect, the electric arc furnace dust is present in an amount from greater than 0 wt % to 8 wt % based on the total weight of the cement (a). The amount of EAFD is not based on the total composition weight; it is based on the weight of the cement (a) only. For example, if 100 kg of cement (a) are present, for 8 wt % EAFD, 8 kg of EAFD are present regardless of the other components. Further, the dry weight cement basis is used, that is, the wt % does not include any water added to set the cement. In a still further aspect, the electric arc furnace dust is present in an amount of at least about 0.1 wt %, for example, at least about 0.5, 1, 2, 3, 4, 5, 6, or 7 wt %, based on the total weight of the cement (a). In a yet further aspect, the electric arc furnace dust is present in an amount from about 0.1 wt % to 8 wt %, for example, from about 1 wt % to 8 wt %, from about 2 wt % to 8 wt %, from about 3 wt % to 8 wt %, or from about 4 wt % to 8 wt %, based on the total weight of the cement (a).

In another aspect, the electric arc furnace dust is present in an amount from greater than 8 wt % based on the total weight of the cement (a). In a still further aspect, the electric arc furnace dust is present in an amount of at least about 8.1 wt %, for example, at least about 9, 10, 11, 12, 13, 14, or 15 wt %, based on the total weight of the cement (a). In a yet further aspect, the electric arc furnace dust is present in an amount from greater than 8 wt % to about 15 wt %, for example, from greater than 8 wt % to 15 wt %, from greater than 9 wt % to 15 wt %, from greater than 10 wt % to 15 wt %, from greater than 11 wt % to 15 wt %, or from greater than 12 wt % to 15 wt %, based on the total weight of the cement (a).

As previously described, the disclosed compositions comprise a cement accelerator. In one aspect, the cement accelerator comprises calcium nitrite, calcium nitrate, calcium formate, calcium chloride, or sodium nitrate, or a combination thereof. In another aspect, the cement accelerator comprises calcium chloride, calcium nitrate, or sodium nitrate, or a combination thereof. In yet another aspect, the cement accelerator comprises a non-chloride cement accelerator. In a further aspect, the cement accelerator comprises calcium nitrite, or calcium formate, or a combination thereof.

In a further aspect the cement accelerator is present in an amount from greater than 0.1 wt % based on the total weight of the cement (a). The amount of non-chloride cement accelerator is not based on the total composition weight; it is based on the weight of the cement (a) only. For example, if 100 kg of cement (a) are present, for 3.5 wt % cement accelerator, 3.5 kg of cement accelerator are present regardless of the other components. Further, the dry weight cement basis is used, that is, the wt % does not include any water added to set the cement. In a still further aspect, the cement accelerator is present in an amount of at least about 0.5 wt %, for example, at least about 1.0, 1.5, 2.0, 2.5, 3.0, 3.5, 4.0, 4.5, 5.0, 5.5, 6.0, 6.5, 7.0, 7.5 or 8.0 wt %, based on the total weight of the cement (a). In a yet further aspect, the cement accelerator is present in an amount from greater than 0 wt % to about 8 wt %, for example, from greater than 0 wt % to about 3.5 wt %, from greater than 0 wt % to about 4 wt %, or from greater than 0 wt % to about 4.5 wt %, based on the total weight of the cement (a).

In various aspects, the disclosed compositions optionally comprise at least one additional chemical component. In a further aspect, the chemical component comprises an accelerator, a retarder, a plasticizer, a superplasticizer, a pigment, a corrosion inhibitor, a bonding agent, or a pumping agent, or a combination thereof. In a still further aspect, the disclosed compositions further comprise a reinforcing component, such as, for example, steel reinforcement bars, steel mesh, steel fibers, glass fibers, carbon fibers, or plastic fibers, or the like.

As disclosed herein, the present invention provides, in various aspects, cement compositions comprising EAFD which exhibit improved workability and/or early compressive strength. In a further aspect, the disclosed compositions exhibit a compressive strength of at least 1 MPa after 3 days of curing, for example, at least about 5, 10, 20, 30, or 40 MPa after 3 days of curing. In a yet further aspect, the disclosed compositions exhibit a compressive strength of at least 1 MPa after 7 days of curing, for example, at least about 5, 10, 20, 30, 40, 50, 60, 70, or 80 MPa after 7 days of curing. In a still further aspect, the disclosed compositions exhibit improved compressive strength after 28 days of curing. In a yet further aspect, the disclosed compositions exhibit a compressive strength of at least about 40 MPa after 28 days of curing, for example, at least about 50, 60, 70, or 80 MPa after 28 days of curing.

In a further aspect, the disclosed compositions exhibit improved workability or slump when mixing with water. In a still further aspect, the disclosed compositions exhibit a slump value of at least 1 mm as defined by BS EN 206-1, for example, at least about 5, 10, 15, 20, 25, 30, 35, 40, 45, 50 mm, or even at least about 55, 60, 65, 70, 75, 80, 85, 90, 95, 100 mm, or even at least about 105, 110, 115, 120, 125, or 130 mm, as defined by BS EN 206-1.

In a further aspect, the disclosed compositions comprise a cementitious product. In a still further aspect, the disclosed compositions comprise a hydraulically set product formed from the disclosed composition. In a yet further aspect, the disclosed compositions comprise concrete.

Articles and Products

The disclosed compositions are useful in the manufacture of various end use articles or products. In one aspect, various cementitious products are formed from a hydraulically set product comprising the disclosed compositions. In a further aspect, the disclosed compositions are formed into useful shaped articles or products by a variety of means such as, for example, using molds, casts, or forms, or the like. Any typical process of forming cement or concrete can be used herein.

As described herein, the disclosed compositions can, in various aspects, advantageously exhibit early compressive strength development. Thus, in one aspect, the disclosed compositions are useful in cast-in-place or poured-in-place applications, where sufficient early compressive strength can be critical. In a further aspect, the disclosed compositions are useful in precast applications such as, for example, forming precast structural products.

In one aspect, the invention relates to molded articles, the articles comprising the cast or set product formed from a composition comprising: (1) cement; (2) an electric arc furnace dust (EAFD); and (3) a cement accelerator; wherein the electric arc furnace dust is present in an amount from greater than 8 wt % based on the total weight of the cement (1). In a still further aspect, the composition used to form the articles further comprises an aggregate component. In a yet further aspect, the composition further comprises one or more chemical components as described herein.

In another aspect, the invention relates to molded articles, the articles comprising the cast or set product formed from a composition comprising: (1) cement; (2) an electric arc furnace dust (EAFD); and (3) a cement accelerator comprising calcium chloride, calcium nitrate or sodium nitrate, or a combination thereof; wherein the electric arc furnace dust is present in an amount from greater than 0 wt % to 8 wt % based on the total weight of the cement (1). In a still further aspect, the composition used to form the articles further comprises an aggregate component. In a yet further aspect, the composition further comprises one or more chemical components as described herein.

In another aspect, the invention relates to molded articles, the articles comprising the hydraulically set product formed from a composition comprising: (1) cement; (2) an electric arc furnace dust (EAFD); and (3) a cement accelerator; wherein the electric arc furnace dust is present in an amount from greater than 8 wt % based on the total weight of the cement (1). In a still further aspect, the composition used to form the articles further comprises an aggregate component. In a yet further aspect, the composition further comprise one or more chemical components as described herein.

In another aspect, the invention relates to molded articles, the articles comprising the hydraulically set product formed from a composition comprising: (1) cement; (2) an electric arc furnace dust (EAFD); and (3) a cement accelerator comprising calcium chloride, calcium nitrate or sodium nitrate, or a combination thereof; wherein the electric arc furnace dust is present in an amount from greater than 0 wt % to 8 wt % based on the total weight of the cement (1). In a still further aspect, the composition used to form the articles further comprises an aggregate component. In a yet further aspect, the composition further comprises one or more chemical components as described herein.

In a further aspect, the articles or products comprise different types of structures and components of structures produced using the disclosed compositions. Typically, any cement or concrete structure is applicable herein. In a still further aspect, non-limiting examples of articles or uses include, for example, building and construction applications, slabs, foundations, walls, bricks, blocks, walls beams, columns, foundations, frames, architectural structures, pipes, pavements, bridges, overpasses, motorways, roads, runways, parking structures, dams, pools, reservoirs, pipes, footings, gates, fences, poles, and like applications.

Manufacture of Compositions and Products

In various aspects, the compositions and products according to the present invention can be manufactured by various methods. In one aspect, the disclosed compositions are blended by a variety of methods involving intimate admixing of the materials. In a further aspect, the methods further comprise incorporating any additional additives desired in the composition. In another aspect, the disclosed compositions are formed into articles or products by a variety of means such as, for example, using molds, casts, or forms, or the like.

Thus, in one aspect, disclosed are methods for manufacturing cement that contains electric arc furnace dust, the methods comprising mixing cement ingredients comprising: (1) cement, (2) an electric arc furnace dust (EAFD), and (3) a cement accelerator; to thereby form a cement mixture; wherein the electric arc furnace dust is present in an amount from greater than 8 wt % based on the total weight of the cement (1). In a further aspect, the methods comprise one or more additional steps comprising adding water, adding an aggregate component, or adding one or more chemical components as described herein. In an even further aspect, the methods further comprise setting the cement mixture or casting the cement mixture to produce cast cement.

Thus, in one aspect, disclosed are methods for manufacturing cement that contains electric arc furnace dust, the methods comprising mixing cement ingredients comprising: (1) cement, (2) an electric arc furnace dust (EAFD), and (3) a cement accelerator comprising calcium chloride, calcium nitrate, or sodium nitrate, or a combination thereof; to thereby form a cement mixture; wherein the electric arc furnace dust is present in an amount from greater than 0 wt % to 8 wt % based on the total weight of the cement (1). In a further aspect, the methods comprise one or more additional steps comprising adding water, adding an aggregate component, or adding one or more chemical components as described herein. In an even further aspect, the methods further comprise setting the cement mixture or casting the cement mixture to produce cast cement.

In another aspect, the invention provides methods of forming an article or product, the method comprising the steps of: (a) preparing a cement composition by combining: (1) cement; (2) an electric arc furnace dust (EAFD); (3) a cement accelerator; wherein the electric arc furnace dust is present in an amount from greater than 8 wt % based on the total weight of the cement (1); and (b) forming an article or product from the prepared cement composition. In a further aspect, the composition used to form the articles or products further comprises an aggregate component. In a yet further aspect, the composition further comprises one or more chemical components as described herein.

In another aspect, the invention provides methods of forming an article or product, the method comprising the steps of: (a) preparing a cement composition by combining: (1) cement; (2) an electric arc furnace dust (EAFD); (3) a cement accelerator comprising calcium chloride, calcium nitrate, or sodium nitrate, or a combination thereof; wherein the electric arc furnace dust is present in an amount from greater than 0 wt % to 8 wt % based on the total weight of the cement (1); and (b) forming an article or product from the prepared cement composition. In a further aspect, the composition used to form the articles or products further comprises an aggregate component. In a yet further aspect, the composition further comprises one or more chemical components as described herein.

In various aspects, the disclosed methods for manufacturing the disclosed compositions and products can be performed in any order. In one aspect, the EAFD is introduced by mixing the desired proportion of EAFD with dry cement powder. In a further aspect, the EAFD and cement mixture is dry mixed, for example, to ensure adequate dispersion of EAFD particles in the resulting mixture. In another aspect, aggregate is added to the dry mixture and mixed. In another aspect, the cement accelerator, when present, is dissolved in mixing water, and then added to the dry mixture. In another aspect, the cement accelerator, when present, is added to the dry mixture before adding mixing water. In another aspect, mixing water is added to the dry mixture and all constituents are mixed together, for example, to form a uniform consistency.

In a further aspect, the resulting mixture is cast in a mold to produce a cast composition or product. In various aspects, the casting process comprises any typical cement or concrete casting process. In another aspect, the casting process is carried out in multiple steps. In a further aspect, the casting process comprises a vibration step. In a still further aspect, the vibration step comprises vibrating the filled mold, for example, to remove air and/or minimize segregation. In another aspect, the top surface of the filled mold is removed. In a further aspect, fresh mixture is added to fill the mold. In another aspect, the vibration and filling steps are repeated as necessary to produce the desired composition or product.

In various aspects, the disclosed methods and compositions comprising EAFD can provide numerous environmental advantages. In one aspect, use of EAFD in cement according to the present invention provides an effective means of EAFD disposal. In a further aspect, the disclosed methods and compositions, by utilizing EAFD, reduce potential environment problems associated with EAFD disposal. In a yet further aspect, the disclosed methods and compositions eliminate the need to dispose EAFD as land fill. In a still further aspect, the reduction in EAFD disposal free landfill space.

In another aspect, use of EAFD as a partial replacement of cement raw materials in accordance with the methods and compositions of the present invention reduces the high $CO_2$ emission generated during manufacture of cement.

In various aspects, the disclosed compositions exhibit significantly improved properties. In one aspect, the disclosed compositions exhibit significantly improved workability and/or compressive strength properties. In a further aspect, the disclosed compositions effectively overcome EAFD-induced retardation.

In another aspect, the compositions disclosed herein provide robust early compressive strength, for example, early compressive strength values of at least 5 MPa after 7 days of curing. In a further aspect, the disclosed compositions exhibit robust early compressive strength while still achieving higher compressive strength values at 28 days than a substantially identical reference composition without EAFD or cement accelerator.

In another aspect, the disclosed compositions and products exhibit reduced bleeding. Bleeding is also referred to as water gain, and is a particular form of segregation, in which a portion of the water from the cement or concrete mixture comes out to the surface. In some cases, a quantity of cement can also come to the surface along with this water, and in such cases, the top surface can have diminished wearing quality. Thus, in a further aspect, the disclosed compositions and products can exhibit improved wear and durability. In a still further aspect, the disclosed compositions and products having improved durability exhibit improved resistance to the ingress of aggressive agents from the environment, such as, for example, $Cl^-$, $SO_4^{2-}$ or $CO_2$.

In one aspect, the disclosed compositions and products also exhibit enhanced chloride binding capacity. In another aspect, the disclosed compositions and products exhibit reduced risk of corrosion. In yet another aspect, the disclosed compositions and products exhibit reduced corrosion rates.

In various aspects, the disclosed compositions and products also provide economical advantages. In one aspect, the disclosed compositions and products are useful in thin part applications such as, roof slabs or road slabs, and high temperature or sunny environments that can accelerate excessive bleeding. As described above, articles and products formed from the disclosed compositions exhibit improved wearing quality. As such, articles and products formed from the disclosed compositions can require less frequent replacement or repair. In a further aspect, the improved surface quality of articles and products formed from the disclosed compositions generate less surface dust in hot environments and less mud in rainy environments.

In another aspect, the disclosed methods and compositions utilize untreated EAFD, thereby avoiding the cost associated with pretreatment of EAFD. In another aspect, the disclosed compositions are useful in high temperature environments that can negatively impact cement or concrete properties. In such cases, demanding and costly interventions, such as, adding ice or additional chemicals, are required to prevent or counteract adverse effects on the cement or concrete properties. In a further aspect, the disclosed compositions and products can be used in high temperature environments without the need for ice or chemicals to counteract high temperature effects.

The present invention includes at least the following embodiments.

Embodiment 1

A cement composition comprising: (a) cement; (b) an electric arc furnace dust (EAFD); and (c) a cement accelerator; wherein the electric arc furnace dust is present in an amount from greater than 8 wt % based on the total weight of cement (a).

Embodiment 2

The composition of embodiment 1, further comprising an aggregate component.

Embodiment 3

The composition of embodiment 2, wherein the aggregate component comprises sand, gravel, limestone, granite, marble, or stone, or a combination thereof.

Embodiment 4

The composition of any preceding embodiment, wherein the cement component comprises Ordinary Portland Cement (OPC) Type I, Type II, Type III, or Type IV, or a combination thereof.

Embodiment 5

The composition of any preceding embodiment, wherein the electric arc furnace dust is bag house dust (BHD).

Embodiment 6

The composition of any preceding embodiment, wherein the electric arc furnace dust is present in an amount of at least 9 wt % based on the total weight of cement (a).

Embodiment 7

The composition of any preceding embodiment, wherein the electric arc furnace dust is present in an amount of at least 10 wt % based on the total weight of cement (a).

Embodiment 8

The composition of any preceding embodiment, wherein the electric arc furnace dust is present in an amount of at least 11 wt % based on the total weight of cement (a).

Embodiment 9

The composition of any preceding embodiment, wherein the electric arc furnace dust is present in an amount of at least 12 wt % based on the total weight of cement (a).

Embodiment 10

The composition of any preceding embodiment, wherein the electric arc furnace dust is present in an amount of at least 13 wt % based on the total weight of cement (a).

Embodiment 11

The composition of any preceding embodiment, wherein the electric arc furnace dust is present in an amount of at least 14 wt % based on the total weight of cement (a).

Embodiment 12

The composition of any preceding embodiment, wherein the electric arc furnace dust is present in an amount from greater than 8 wt % to 15 wt % based on the total weight of cement (a).

Embodiment 13

The composition of any preceding embodiment, wherein the electric arc furnace dust is present in an amount from at least 9 wt % to 15 wt % based on the total weight of cement (a).

Embodiment 14

The composition of any preceding embodiment, wherein the electric arc furnace dust is present in an amount from at least 10 wt % to 15 wt % based on the total weight of cement (a).

Embodiment 15

The composition of any preceding embodiment, wherein the electric arc furnace dust is present in an amount from at least 11 wt % to 15 wt % based on the total weight of cement (a).

Embodiment 16

The composition of any preceding embodiment, wherein the electric arc furnace dust is present in an amount from at least 12 wt % to 15 wt % based on the total weight of cement (a).

Embodiment 17

The composition of any preceding embodiment, wherein the cement accelerator comprises calcium nitrite, calcium nitrate, calcium formate, calcium chloride, or sodium nitrate, or a combination thereof.

Embodiment 18

The composition of any preceding embodiment, wherein the cement accelerator comprises calcium nitrite, or calcium formate, or a combination thereof.

Embodiment 19

The composition of any preceding embodiment, wherein the cement accelerator comprises calcium chloride, calcium nitrate, or sodium nitrate, or a combination thereof.

Embodiment 20

The composition of any preceding embodiment, wherein the cement accelerator comprises a non-chloride cement accelerator.

Embodiment 21

The composition of any preceding embodiment, wherein the cement accelerator is present in an amount greater than 0.5 wt % based on the total weight of cement (a).

Embodiment 22

The composition of any preceding embodiment, wherein the cement accelerator is present in an amount of at least 1 wt % based on the total weight of cement (a).

Embodiment 23

The composition of any preceding embodiment, wherein the cement accelerator is present in an amount of at least 1.5 wt % based on the total weight of cement (a).

Embodiment 24

The composition of any preceding embodiment, wherein the cement accelerator is present in an amount of at least 2 wt % based on the total weight of cement (a).

Embodiment 25

The composition of any preceding embodiment, wherein the cement accelerator is present in an amount of at least 2.5 wt % based on the total weight of cement (a).

Embodiment 26

The composition of any preceding embodiment, wherein the cement accelerator is present in an amount of at least 3 wt % based on the total weight of cement (a).

Embodiment 27

The composition of any preceding embodiment, wherein the cement accelerator is present in an amount of at least 3.5 wt % based on the total weight of cement (a).

Embodiment 28

The composition of any preceding embodiment, wherein the cement accelerator is present in an amount of at least 4 wt % based on the total weight of cement (a).

Embodiment 29

The composition of any preceding embodiment, wherein the cement accelerator is present in an amount of at least 4.5 wt % based on the total weight of cement (a).

Embodiment 30

The composition of any preceding embodiment, wherein the cement accelerator is present in an amount of at least 5 wt % based on the total weight of cement (a).

Embodiment 31

The composition of any preceding embodiment, wherein the cement accelerator is present in an amount greater than 0 wt % to 3.5 wt % based on the total weight of cement (a).

Embodiment 32

The composition of any preceding embodiment, wherein the cement accelerator is present in an amount greater than 0 wt % to 4 wt % based on the total weight of cement (a).

Embodiment 33

The composition of any preceding embodiment, wherein the cement accelerator is present in an amount greater than 0 wt % to 4.5 wt % based on the total weight of cement (a).

Embodiment 34

The composition of any preceding embodiment, wherein the cement accelerator is present in an amount greater than 0 wt % to 5 wt % based on the total weight of cement (a).

Embodiment 35

The composition of any preceding embodiment, further comprising at least one additional chemical component comprising an accelerator, a retarder, a plasticizer, a superplasticizer, a pigment, a corrosion inhibitor, a bonding agent, or a pumping agent, or a combination thereof.

Embodiment 36

The composition of any preceding embodiment, further comprising a reinforcement structure.

Embodiment 37

The composition of any preceding embodiment, wherein the composition exhibits a compressive strength of at least 5 MPa after 3 days of curing.

Embodiment 38

The composition of any preceding embodiment, wherein the composition exhibits a compressive strength of at least 10 MPa after 3 days of curing.

Embodiment 39

The composition of any preceding embodiment, wherein the composition exhibits a compressive strength of at least 20 MPa after 3 days of curing.

Embodiment 40

The composition of any preceding embodiment, wherein the composition exhibits a compressive strength of at least 30 MPa after 3 days of curing.

Embodiment 41

The composition of any preceding embodiment, wherein the composition exhibits a compressive strength of at least 40 MPa after 3 days of curing.

Embodiment 42

The composition of any preceding embodiment, wherein the composition exhibits a compressive strength of at least 5 MPa after 7 days of curing.

Embodiment 43

The composition of any preceding embodiment, wherein the composition exhibits a compressive strength of at least 10 MPa after 7 days of curing.

Embodiment 44

The composition of any preceding embodiment, wherein the composition exhibits a compressive strength of at least 20 MPa after 7 days of curing.

Embodiment 45

The composition of any preceding embodiment, wherein the composition exhibits a compressive strength of at least 30 MPa after 7 days of curing.

Embodiment 46

The composition of any preceding embodiment, wherein the composition exhibits a compressive strength of at least 40 MPa after 7 days of curing.

Embodiment 47

The composition of any preceding embodiment, wherein the composition exhibits a compressive strength of at least 50 MPa after 7 days of curing.

Embodiment 48

The composition of any preceding embodiment, wherein the composition exhibits a compressive strength of at least 60 MPa after 7 days of curing.

Embodiment 49

The composition of any preceding embodiment, wherein the composition exhibits a compressive strength of at least 70 MPa after 7 days of curing.

Embodiment 50

The composition of any preceding embodiment, wherein the composition exhibits a compressive strength of at least 80 MPa after 7 days of curing.

Embodiment 51

The composition of any preceding embodiment, wherein the composition exhibits a compressive strength of at least 40 MPa after 28 days of curing.

Embodiment 52

The composition of any preceding embodiment, wherein the composition exhibits a compressive strength of at least 50 MPa after 28 days of curing.

Embodiment 53

The composition of any preceding embodiment, wherein the composition exhibits a compressive strength of at least 60 MPa after 28 days of curing.

Embodiment 54

The composition of any preceding embodiment, wherein the composition exhibits a compressive strength of at least 70 MPa after 28 days of curing.

Embodiment 55

The composition of any preceding embodiment, wherein the composition exhibits a compressive strength of at least 80 MPa after 28 days of curing.

Embodiment 56

The composition of any preceding embodiment, wherein the composition after mixing with water exhibits a slump value of at least 1 mm as defined by BS EN 206-1.

Embodiment 57

The composition of any preceding embodiment, wherein the composition after mixing with water exhibits a slump value of at least 20 mm as defined by BS EN 206-1.

Embodiment 58

The composition of any preceding embodiment, wherein the composition after mixing with water exhibits a slump value of at least 40 mm as defined by BS EN 206-1.

Embodiment 59

The composition of any preceding embodiment, wherein the composition after mixing with water exhibits a slump value of at least 60 mm as defined by BS EN 206-1.

Embodiment 60

The composition of any preceding embodiment, wherein the composition after mixing with water exhibits a slump value of at least 70 mm as defined by BS EN 206-1

Embodiment 61

The composition of any preceding embodiment, wherein the composition after mixing with water exhibits a slump value of at least 80 mm as defined by BS EN 206-1

Embodiment 62

The composition of any preceding embodiment, wherein the composition after mixing with water exhibits a slump value of at least 100 mm as defined by BS EN 206-1

Embodiment 63

The composition of any preceding embodiment, wherein the composition after mixing with water exhibits a slump value of at least 110 mm as defined by BS EN 206-1.

Embodiment 64

The composition of any preceding embodiment, wherein the composition after mixing with water exhibits a slump value of at least 120 mm as defined by BS EN 206-1.

Embodiment 65

The composition of any preceding embodiment, wherein the composition after mixing with water exhibits a slump value of at least 130 mm as defined by BS EN 206-1.

Embodiment 66

The composition of any preceding embodiment, wherein the composition after mixing with water exhibits a slump value of at least 140 mm as defined by BS EN 206-1.

Embodiment 67

The composition of any preceding embodiment, wherein the composition is concrete.

Embodiment 68

A cementitious product comprising a hydraulically set product formed from the composition of any preceding embodiment.

Embodiment 69

A method for manufacturing cement that contains electric arc furnace dust, the method comprising: (a) mixing cement ingredients comprising: (i) cement; (ii) an electric arc furnace dust (EAFD); and (iii) a cement accelerator; to thereby form a cement mixture; wherein the electric arc furnace dust is present in an amount from greater than 8 wt % based on the total weight of cement (i).

Embodiment 70

The method of embodiment 69, further comprising setting the cement mixture.

Embodiment 71

The method of any preceding embodiment, further comprising adding an aggregate component.

Embodiment 72

The method any preceding embodiment, further comprising casting the cement mixture to produce cast cement.

Embodiment 73

The method of any preceding embodiment, wherein the electric arc furnace dust is bag house dust (BHD).

Embodiment 74

The method of any preceding embodiment, wherein the cement accelerator comprises calcium nitrite, calcium nitrate, calcium formate, calcium chloride, or sodium nitrate, or a combination thereof.

Embodiment 75

The method of any preceding embodiment, wherein the cement accelerator comprises calcium nitrite, or calcium formate, or a combination thereof.

Embodiment 76

The method of any preceding embodiment, wherein the cement accelerator comprises calcium chloride, or sodium nitrate, or a combination thereof.

Embodiment 77

The method of any preceding embodiment, wherein the cement accelerator comprises a non-chloride cement accelerator.

Embodiment 78

The method of any preceding embodiment, wherein the cement mixture exhibits a compressive strength of at least 5 MPa after 7 days of curing.

Embodiment 79

The method of any preceding embodiment, wherein the cement mixture after mixing with water exhibits a slump value at least 1 mm as defined by BS EN 206-1.

Embodiment 80

The method of any preceding embodiment, wherein the cement mixture after mixing with water exhibits a slump value at least 60 mm as defined by BS EN 206-1.

Embodiment 81

The method of any preceding embodiment, wherein the cement mixture after mixing with water exhibits a slump value at least 130 mm as defined by BS EN 206-1.

Embodiment 82

A product made by the method of any preceding embodiment.

Embodiment 83

A cement composition comprising: (a) cement; (b) an electric arc furnace dust (EAFD); and (c) a cement accelerator comprising calcium chloride, calcium nitrate, or sodium nitrate, or a combination thereof; wherein the electric arc furnace dust is present in an amount from greater than 0 wt % to 8 wt % based on the total weight of cement (a).

Embodiment 84

The composition of embodiment 83, further comprising an aggregate component.

Embodiment 85

The composition of embodiment 84, wherein the aggregate component comprises sand, gravel, limestone, granite, marble, or stone, or a combination thereof.

Embodiment 86

The composition of any preceding embodiment, wherein the cement component comprises Ordinary Portland Cement (OPC) Type I, Type II, Type III, or Type IV, or a combination thereof.

Embodiment 87

The composition of any preceding embodiment, wherein the electric arc furnace dust is bag house dust (BHD).

Embodiment 88

The composition of any preceding embodiment, wherein the electric arc furnace dust is present in an amount of at least 0.1 wt % based on the total weight of cement (a).

Embodiment 89

The composition of any preceding embodiment, wherein the electric arc furnace dust is present in an amount of at least 1 wt % based on the total weight of cement (a).

Embodiment 90

The composition of any preceding embodiment, wherein the electric arc furnace dust is present in an amount of at least 2 wt % based on the total weight of cement (a).

Embodiment 91

The composition of any preceding embodiment, wherein the electric arc furnace dust is present in an amount of at least 3 wt % based on the total weight of cement (a).

Embodiment 92

The composition of any preceding embodiment, wherein the electric arc furnace dust is present in an amount of at least 4 wt % based on the total weight of cement (a).

Embodiment 93

The composition of any preceding embodiment, wherein the electric arc furnace dust is present in an amount of at least 5 wt % based on the total weight of cement (a).

Embodiment 94

The composition of any preceding embodiment, wherein the cement accelerator is present in an amount greater than 0.5 wt % based on the total weight of cement (a).

Embodiment 95

The composition of any preceding embodiment, wherein the cement accelerator is present in an amount of at least 1 wt % based on the total weight of cement (a).

Embodiment 96

The composition of any preceding embodiment, wherein the cement accelerator is present in an amount of at least 1.5 wt % based on the total weight of cement (a).

Embodiment 97

The composition of any preceding embodiment, wherein the cement accelerator is present in an amount of at least 2 wt % based on the total weight of cement (a).

Embodiment 98

The composition of any preceding embodiment, wherein the cement accelerator is present in an amount of at least 2.5 wt % based on the total weight of cement (a).

Embodiment 99

The composition of any preceding embodiment, wherein the cement accelerator is present in an amount of at least 3 wt % based on the total weight of cement (a).

Embodiment 100

The composition of any preceding embodiment, wherein the cement accelerator is present in an amount of at least 3.5 wt % based on the total weight of cement (a).

Embodiment 101

The composition of any preceding embodiment, wherein the cement accelerator is present in an amount of at least 4 wt % based on the total weight of cement (a).

Embodiment 102

The composition of any preceding embodiment, wherein the cement accelerator is present in an amount of at least 4.5 wt % based on the total weight of cement (a).

Embodiment 103

The composition of any preceding embodiment, wherein the cement accelerator is present in an amount of at least 5 wt % based on the total weight of cement (a).

Embodiment 104

The composition of any preceding embodiment, wherein the cement accelerator is present in an amount greater than 0 wt % to 3.5 wt % based on the total weight of cement (a).

Embodiment 105

The composition of any preceding embodiment, wherein the cement accelerator is present in an amount greater than 0 wt % to 4 wt % based on the total weight of cement (a).

Embodiment 106

The composition of any preceding embodiment, wherein the cement accelerator is present in an amount greater than 0 wt % to 4.5 wt % based on the total weight of cement (a).

Embodiment 107

The composition of any preceding embodiment, wherein the cement accelerator is present in an amount greater than 0 wt % to 5 wt % based on the total weight of cement (a).

Embodiment 108

The composition of any preceding embodiment, further comprising at least one additional chemical component comprising an accelerator, a retarder, a plasticizer, a superplasticizer, a pigment, a corrosion inhibitor, a bonding agent, or a pumping agent, or a combination thereof.

Embodiment 109

The composition of any preceding embodiment, further comprising a reinforcement structure.

Embodiment 110

The composition of any preceding embodiment, wherein the composition exhibits a compressive strength of at least 5 MPa after 3 days of curing.

Embodiment 111

The composition of any preceding embodiment, wherein the composition exhibits a compressive strength of at least 10 MPa after 3 days of curing.

Embodiment 112

The composition of any preceding embodiment, wherein the composition exhibits a compressive strength of at least 20 MPa after 3 days of curing.

Embodiment 113

The composition of any preceding embodiment, wherein the composition exhibits a compressive strength of at least 30 MPa after 3 days of curing.

Embodiment 114

The composition of any preceding embodiment, wherein the composition exhibits a compressive strength of at least 40 MPa after 3 days of curing.

Embodiment 115

The composition of any preceding embodiment, wherein the composition exhibits a compressive strength of at least 5 MPa after 7 days of curing.

Embodiment 116

The composition of any preceding embodiment, wherein the composition exhibits a compressive strength of at least 10 MPa after 7 days of curing.

Embodiment 117

The composition of any preceding embodiment, wherein the composition exhibits a compressive strength of at least 20 MPa after 7 days of curing.

Embodiment 118

The composition of any preceding embodiment, wherein the composition exhibits a compressive strength of at least 30 MPa after 7 days of curing.

Embodiment 119

The composition of any preceding embodiment, wherein the composition exhibits a compressive strength of at least 40 MPa after 7 days of curing.

Embodiment 120

The composition of any preceding embodiment, wherein the composition exhibits a compressive strength of at least 50 MPa after 7 days of curing.

Embodiment 121

The composition of any preceding embodiment, wherein the composition exhibits a compressive strength of at least 60 MPa after 7 days of curing.

Embodiment 122

The composition of any preceding embodiment, wherein the composition exhibits a compressive strength of at least 70 MPa after 7 days of curing.

Embodiment 123

The composition of any preceding embodiment, wherein the composition exhibits a compressive strength of at least 80 MPa after 7 days of curing.

Embodiment 124

The composition of any preceding embodiment, wherein the composition exhibits a compressive strength of at least 40 MPa after 28 days of curing.

Embodiment 125

The composition of any preceding embodiment, wherein the composition exhibits a compressive strength of at least 50 MPa after 28 days of curing.

Embodiment 126

The composition of any preceding embodiment, wherein the composition exhibits a compressive strength of at least 60 MPa after 28 days of curing.

Embodiment 127

The composition of any preceding embodiment, wherein the composition exhibits a compressive strength of at least 70 MPa after 28 days of curing.

Embodiment 128

The composition of any preceding embodiment, wherein the composition exhibits a compressive strength of at least 80 MPa after 28 days of curing.

Embodiment 129

The composition of any preceding embodiment, wherein the composition after mixing with water with water exhibits a slump value of at least 1 mm as defined by BS EN 206-1.

Embodiment 130

The composition of any preceding embodiment, wherein the composition after mixing with water exhibits a slump value of at least 20 mm as defined by BS EN 206-1.

Embodiment 131

The composition of any preceding embodiment, wherein the composition after mixing with water exhibits a slump value of at least 40 mm as defined by BS EN 206-1.

Embodiment 132

The composition of any preceding embodiment, wherein the composition after mixing with water exhibits a slump value of at least 60 mm as defined by BS EN 206-1.

Embodiment 133

The composition of any preceding embodiment, wherein the composition after mixing with water exhibits a slump value of at least 70 mm as defined by BS EN 206-1.

Embodiment 134

The composition of any preceding embodiment, wherein the composition after mixing with water exhibits a slump value of at least 80 mm as defined by BS EN 206-1.

Embodiment 135

The composition of any preceding embodiment, wherein the composition after mixing with water exhibits a slump value of at least 100 mm as defined by BS EN 206-1.

Embodiment 136

The composition of any preceding embodiment, wherein the composition after mixing with water exhibits a slump value of at least 110 mm as defined by BS EN 206-1.

Embodiment 137

The composition of any preceding embodiment, wherein the composition after mixing with water exhibits a slump value of at least 120 mm as defined by BS EN 206-1.

Embodiment 138

The composition of any preceding embodiment, wherein the composition after mixing with water exhibits a slump value of at least 130 mm as defined by BS EN 206-1.

Embodiment 139

The composition of any preceding embodiment, wherein the composition after mixing with water exhibits a slump value of at least 140 mm as defined by BS EN 206-1.

Embodiment 140

The composition of any preceding embodiment, wherein the composition is concrete.

Embodiment 141

A cementitious product comprising a hydraulically set product formed from the composition of any preceding embodiment.

Embodiment 142

A method for manufacturing cement that contains electric arc furnace dust, the method comprising: (a) mixing cement ingredients comprising: (i) cement; (ii) an electric arc furnace dust (EAFD); and (iii) a cement accelerator comprising calcium chloride, or sodium nitrate, or a combination thereof; to thereby form a cement mixture; wherein the electric arc furnace dust is present in an amount from greater than 0 wt % to 8 wt % based on the total weight of cement (i).

Embodiment 143

The method of embodiment 142, further comprising adding an aggregate component.

Embodiment 144

The method any preceding embodiment, further comprising casting the cement mixture to produce cast cement.

Embodiment 145

The method of any preceding embodiment, wherein the electric arc furnace dust is bag house dust (BHD).

Embodiment 146

The method of any preceding embodiment, wherein the cement mixture exhibits a compressive strength of at least 1 MPa after 7 days of curing.

Embodiment 147

The method of any preceding embodiment, wherein the cement mixture after mixing with water exhibits a slump value at least 1 mm as defined by BS EN 206-1.

Embodiment 148

The method of any preceding embodiment, wherein the cement mixture after mixing with water exhibits a slump value at least 60 mm as defined by BS EN 206-1.

Embodiment 149

The method of any preceding embodiment, wherein the cement mixture after mixing with water exhibits a slump value at least 130 mm as defined by BS EN 206-1.

Embodiment 150

A product made by the method of any preceding embodiment.

Without further elaboration, it is believed that one skilled in the art can, using the description herein, utilize the present invention.

Throughout this application, various publications may be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. A cement composition comprising:
   a) cement;
   b) an electric arc furnace dust (EAFD); and
   c) a cement accelerator;
   wherein the electric arc furnace dust is present in an amount from greater than 8 wt % and less than 15 wt % based on the total weight of cement (a).

2. The composition of claim 1, further comprising an aggregate component.

3. The composition of claim 2, wherein the aggregate component comprises sand, gravel, limestone, granite, marble, or stone, or a combination thereof.

4. The composition of claim 1, wherein the cement component comprises Ordinary Portland Cement (OPC) Type I, Type II, Type III, or Type IV, or a combination thereof.

5. The composition of claim 1, wherein the electric arc furnace dust is bag house dust (BHD).

6. The composition of claim 1, wherein the electric arc furnace dust is present in an amount of at least 9 wt % and less than 15 wt % based on the total weight of cement (a).

7. The composition of claim 1, wherein the cement accelerator comprises at least one selected from the group consisting of calcium nitrite, calcium nitrate, calcium formate, calcium chloride, sodium nitrate, and a combination thereof.

8. The composition of claim 1, wherein the cement accelerator comprises a non-chloride cement accelerator.

9. The composition of claim 1, wherein the cement accelerator is present in an amount greater than 0.5 wt % based on the total weight of cement (a).

10. The composition of claim 1, wherein the composition exhibits a compressive strength of at least 5 MPa after 3 days of curing.

11. The composition of claim 2, wherein the aggregate component has a particle size of less than 50 mm.

12. The composition of claim 1, wherein the cement accelerator is present in an amount greater than 0 wt % and less than about 8 wt % based on the total weight of cement (a).

13. The composition of claim 1, wherein the composition exhibits a compressive strength of at least 40 MPa after 28 days of curing.

14. The composition of claim 1, wherein the composition exhibits a slump value of at least 1 mm.

15. A method for manufacturing cement that contains electric arc furnace dust, the method comprising:
   a) mixing cement ingredients comprising:
      i. cement;
      ii. an electric arc furnace dust (EAFD); and
      iii. a cement accelerator; to thereby form a cement mixture;
   wherein the electric arc furnace dust is present in an amount from greater than 8 wt % and less than 15 wt % based on the total weight of cement (i).

16. The method of claim 15, further comprising setting the cement mixture.

17. The method of claim 15, further comprising adding an aggregate component.

18. The method of claim 15, further comprising casting the cement mixture to produce cast cement.

19. A cement composition comprising:
   a) cement;
   b) an electric arc furnace dust (EAFD); and
   c) at least one cement accelerator selected from the group consisting of calcium nitrite, calcium nitrate, calcium formate, and sodium nitrate;
   wherein the electric arc furnace dust is present in an amount from greater than 8 wt % and less than 15 wt % based on the total weight of cement (a); and
   wherein the at least one cement accelerator is present in an amount greater than 0 wt % and less than about 8 wt % based on the total weight of cement (a).

20. A method for manufacturing the cement composition of claim 19, the method comprising:
   a) mixing cement ingredients comprising:
      i. cement;
      ii. the electric arc furnace dust (EAFD); and
      iii. the at least one cement accelerator; to thereby form a cement mixture;
   wherein the electric arc furnace dust is present in an amount from greater than 8 wt % and less than 15 wt % based on the total weight of cement (i).

* * * * *